United States Patent
Cao et al.

(10) Patent No.: US 11,436,502 B2
(45) Date of Patent: Sep. 6, 2022

(54) KNOWLEDGE-TRANSFER-BASED LEARNING FRAMEWORK FOR AIRSPACE SITUATION EVALUATION

(71) Applicant: BEIHANG UNIVERSITY, Beijing (CN)

(72) Inventors: Xianbin Cao, Beijing (CN); Wenbo Du, Beijing (CN); Xi Zhu, Beijing (CN); Yumeng Li, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 828 days.

(21) Appl. No.: 16/179,853

(22) Filed: Nov. 2, 2018

(65) Prior Publication Data

US 2019/0138947 A1     May 9, 2019

(30) Foreign Application Priority Data

Nov. 3, 2017    (CN) .......................... 201711071217.1

(51) Int. Cl.
    *G06N 5/02*           (2006.01)
    *G06F 17/16*         (2006.01)
    *G06N 20/00*        (2019.01)
    *G08G 5/00*          (2006.01)

(52) U.S. Cl.
CPC ............. *G06N 5/027* (2013.01); *G06F 17/16* (2013.01); *G06N 20/00* (2019.01); *G08G 5/0043* (2013.01)

(58) Field of Classification Search
CPC ...... G05D 1/00; G05D 1/0088; G05D 1/0202; G05D 1/0221; G08G 7/00; G08G 7/02; G08G 5/00; G08G 5/0043; G08G 5/0004; G08G 5/0013; G08G 5/0017; G08G 5/0026; G08G 5/003; G08G 5/0034; G08G 5/0039; G08G 5/0047; G08G 5/04; G08G 5/045; G08G 1/00; G06F 17/00; G06F 17/10; G06F 17/11; G06F 17/16; G06F 17/17; G06F 17/175; G06N 20/00; G06N 20/10; G06N 20/20; G06N 7/00; G06N 5/00; G06N 5/02; G06N 5/022; G06N 5/025; G06N 5/027; G06N 5/04
USPC ........................................................ 701/120
See application file for complete search history.

(56) References Cited

U.S. PATENT DOCUMENTS

2013/0317731 A1*   11/2013   Scott .................... G08G 5/0043
                                                                       701/120

* cited by examiner

*Primary Examiner* — Anthony R Jimenez
(74) *Attorney, Agent, or Firm* — Pai Patent & Trademark Law Firm; Chao-Chang David Pai

(57) ABSTRACT

A sector situation (SS) evaluation framework is based on knowledge transfer and is specifically applicable for small-training-sample environment. The SS evaluation framework is able to effectively mine knowledge hidden within the samples of both target and non-target sectors, and properly handle the integration between the knowledge derived from different sectors. This framework includes three main steps: (1) sufficiently mine the knowledge within the samples of the target sector using the strategies of multi-factor subset generation and multi-base evaluator construction, and build target base evaluators; (2) precisely learn the knowledge in the samples of the non-target sectors using similar strategies for the target sector, together with a sample transformation, and build non-target base evaluators; and (3) efficiently integrate the target and non-target base evaluators based on evaluation confidence analysis of those base evaluators.

14 Claims, 6 Drawing Sheets

Input: FP; Size of the FP—$m$; Number of FSSs being generated—$T$; Size of a FSS—$k$ ($k \leq m$); A priori knowledge: SNR(ft) (ft ∈ FP) and $IC_{ft_i/ft_j}$ (ft$i$, ft$j$ ∈ FP, ft$i$ ≠ ft$j$); $\alpha, \beta \in [0, +\infty]$.

Process:
1. For counter1=1 to $T$
2.    Initialize the Candidate Factor Set (CFS) as FP; initialize a FSS as ∅;
3.    for counter2=1 to $k$
6.       Select a factor out of CFS, and put it into FSS, each factor ft$i^{(CFS)}$'s selection probability is proportional to $$\begin{cases} [SNR(ft_i^{(CFS)})]^\alpha & \text{if counter2} = 1 \\ [SNR(ft_i^{(CFS)})]^\alpha [\min_{ft_j^{(FSS)} \in FSS} IC_{ft_i^{(CFS)}/ft_j^{(FSS)}}]^\beta & \text{Otherwise} \end{cases}$$

($1 \leq i \leq m -$ counter2 $+ 1, 1 \leq j \leq$ counter2 $- 1$);
7.    end for (a FSS is obtained)
8. end for

Output: $T$ FSSs (each consisting of $k$ factors)

FIG. 5

KNOWLEDGE-TRANSFER-BASED LEARNING FRAMEWORK FOR AIRSPACE SITUATION EVALUATION

CROSS REFERENCE TO RELATED APPLICATIONS

This Application claims priority of China Patent Application No. 201711071217.1, filed on Nov. 3, 2017, the entirety of which is incorporated by reference herein.

BACKGROUND OF THE INVENTION

1. Technical Field

The invention belongs to air traffic operation and management in general. More particularly to an airspace situation evaluation framework based on machine learning and knowledge transfer.

2. Description of the Prior Art

Worldwide, the air transport industry is growing rapidly, accelerating the movement of goods and people but creating even more challenges to the Air Traffic Management (ATM) system. Especially, large air transport volume imposes high workload on air traffic controllers (ATCos), which is the primary cause of operational errors. For instance, a study driven by the National Aeronautics and Space Administration in 2010 found that ATCos suffer from "chronic fatigue" that has resulted in flight navigation errors, like allowing airplanes to fly too closely together. Besides, in 2014, two on-duty ATCos at the control tower of Wuhan airport, China, fell asleep due to high work pressure, and an approaching flight has to go around in absence of communication with the control tower. Thus, how to evaluate ATCo's workload holds great significance for air traffic safety.

In the current ATM system, a sector is the fundamental airspace unit for traffic operation and control service. During the flying process from departure to destination airport, a flight will successively pass through several sectors with the guidance of ATCos. For properly adjusting the control workload of each sector, it is important to accurately evaluate the sector situation (SS), which actually determines the difficulty of traffic control and naturally an indicator to evaluate whether the ATCo is over-burdened or not. Moreover, SS evaluation can also be applied as a guidance of traffic management, such as rearranging sector configurations and traffic flow, thus it becomes a prevalent research direction in the ATM domain.

Due to numerous interacting factors, people resort to machine learning models for SS evaluation. The machine learning model is capable of constructing the complicated mappings between SS and its correlated factors. The current related methods of machine-learning-based SS evaluation can achieve satisfactory evaluation performance as long as the sample set is sufficiently large. However, due to the following two reasons, we have to evaluate SS with a small sample set: (i) The participation of ATM experts is essential in the sample labeling process. Hence, the sample collection is a time-consuming labor-intensive work that we cannot afford easily; (ii) A machine learning model generally requires that the training samples and the samples to be classified be consistent in every aspect, i.e., the distribution of factors' values and the rules of sample categorization. However, the situation producing mechanisms of sectors can be quite different. Hence, normal machine learning models cannot directly utilize the samples of other non-target sectors for the SS evaluation task of the target sector (For simplicity, we use "target sector" to refer to the sector for which the SS evaluation is carried out, "non-target sectors" for any other sectors apart from the target sector, and "target/non-target samples" for samples of target/non-target sectors). This can further aggravate the lack of training samples. Therefore, it is necessary to develop a SS evaluation model that is capable of sufficiently learning on both target and non-target samples to obtain the ability of accurately evaluating the target samples' SS.

BRIEF SUMMARY OF THE INVENTION

The objective of the present invention is to provide a sector situation (SS) evaluation framework that is capable of sufficiently learning on both target and non-target samples, aiming to accurately evaluate the target sector's SS. The SS evaluation framework is based on knowledge transfer and is specifically applicable for small-training-sample environment. The SS evaluation framework is able to effectively mine knowledge hidden within the samples of both target and non-target sectors, and properly handle the integration between the SS evaluation knowledge derived from different sectors.

This SS evaluation framework includes a server and a memory module storing airspace operation data and connected to the server via a local area or wide area network. The airspace operation data includes aircraft trajectory data and airspace configuration data, etc. The SS evaluation framework evaluates the airspace situation by executing steps including:

(1) sufficiently mine the knowledge within the samples of the target sector using the strategies of multi-factor subset generation and multi-base evaluator construction, and multiple target base evaluators will be built after executing these strategies;

(2) precisely learn the knowledge in the samples of the non-target sectors using similar strategies (multi-factor subset generation and multi-base evaluator construction) for the target samples, together with a sample transformation strategy, and multiple non-target base evaluators will be built after implementing these strategies: and (3) efficiently integrate the target and non-target base evaluators based on evaluation confidence analysis of those target and non-target base evaluators.

BRIEF DESCRIPTION OF THE DRAWINGS

Embodiments will now be described by way of non-limiting examples in conjunction with the following figures:

FIG. 5 shows the workflow of the generation of factor subsets.

DETAILED DESCRIPTION OF THE INVENTION

Figure 1:
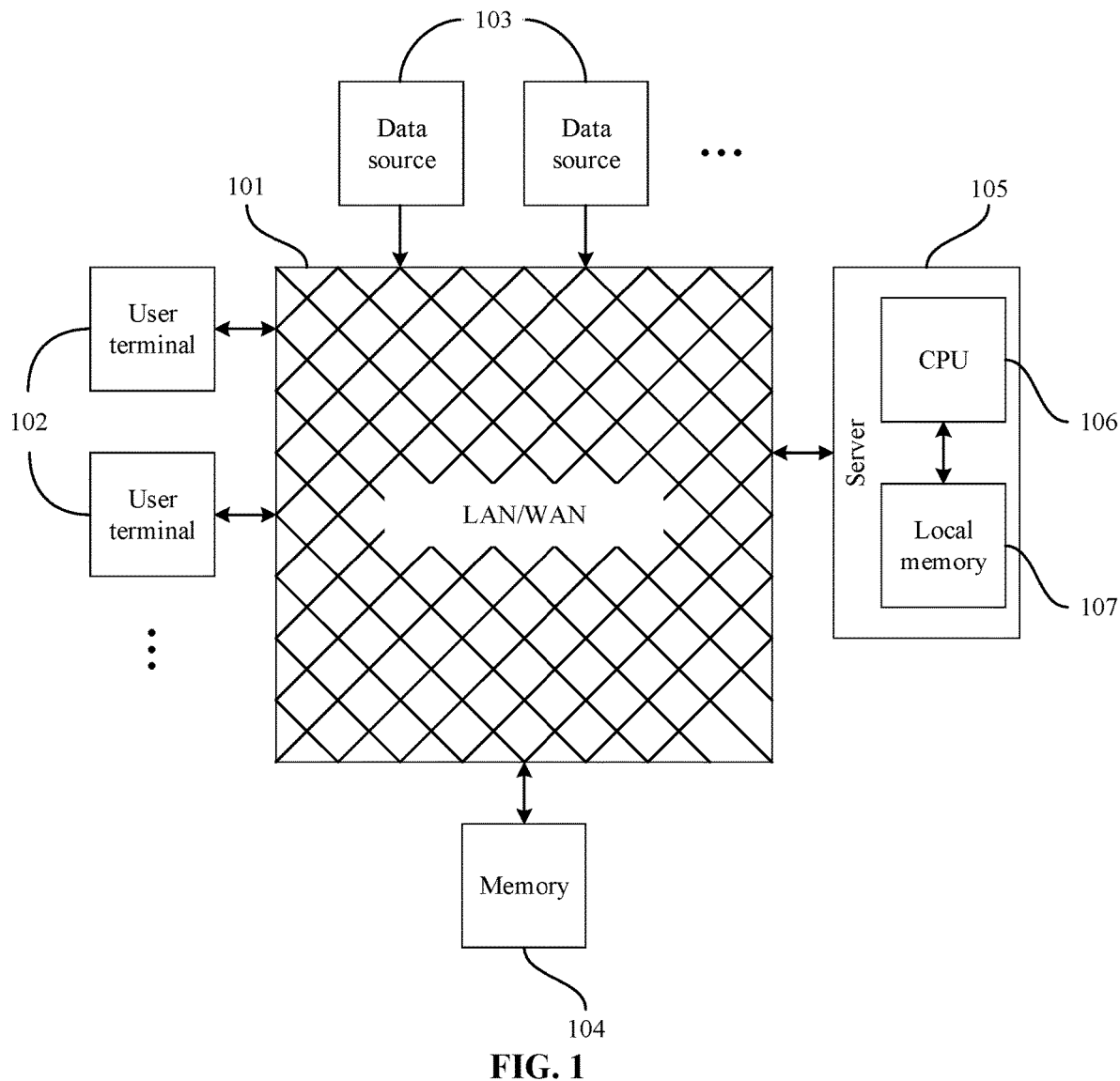
FIG. 1 shows a schematic system in which the present invention may be implemented.

FIG. 1 shows a system on which SSEF is built and used according to the present application. The system comprises several modules, i.e., the user terminals 102, the data sources 103, the memory 104, the server 105 which comprises a central processing unit (CPU) 106 and a local memory 107, the local/wide area network (LAN/WAN) 101 which is responsible for the connectivity between all the components, making sure the information exchange between each two components can be implemented smoothly. The core component of the system is the server 105, which is a high-performance computer device whose main modules include a general-purpose processor CPU 106 and a local memory 107. The CPU 106 has certain abilities to execute multiple calculation tasks: generating SS samples based on airspace operation data (historical/real-time aircraft trajectory data, airspace configuration data, etc.) input from the data sources 103; training a SSEF based on SS samples and determining the situation label of the samples to be evaluated; providing statistics of the historical/real-time situation conditions of airspaces of interest. The local memory 107 appended to the CPU 106 is employed for storing the computer program which is loaded to CPU 106 as needed. The source codes of the program can be written in any programming language, such as C++, Java, Python, etc., or a combination of them. A number of user terminals 102 are used by technical people to control and configure the system, i.e., to select the SS evaluation tasks which they want the system to do, to update the program codes, and so on. The data sources 103 are general interfaces for inputting data, such as aircraft traffic trajectory data, airspace configuration data, SS samples (which may be generated by another system of the same type), etc., and these data will be stored to the memory 104, which is a large-capacity computer readable and writeable storage medium, i.e., a hard disk, a random access memory (RAM), etc. Besides, the memory 104 is also applied for storing evaluation results and statistics of SS.

To evaluate the situation of a target sector, two fundamental tasks have to be done first: (i) identify the airspace situation factors as comprehensive as possible (subsequently, the single word "factor" is used to refer to the airspace situation factor). These factors, by which SS is evaluated, are the attributes, parameters and ingredients of airspace and traffic that can influence or reflect the airspace situation. To date, many scholars in the ATM field have proposed a great many of factors, whose values are generally calculated based on some raw airspace operation data, like aircraft trajectory data, airspace configuration data, etc. Table 1 exemplifies some factors (wherein similar factors are grouped together); (ii) collect as many airspace situation samples of the target sector as possible (subsequently, the single word "sample" is used to refer to the airspace situation sample). One sample corresponds to the traffic scenario within the target sector of one certain time slice, and it comprises the values of the factors and the SS condition corresponding ta the values of those factors. The SS condition, which is the label of a sample, is provided by ATM experts. It can be characterized as a continuous index, e.g., sector congestion degree, or discrete levels, e.g., low/normal/high complexity.

TABLE 1

| Factor | Annotation |
|---|---|
| Nb, Nb$^2$, N$_{ds}$, N$_{cl}$ | Nb: total number of aircraft; Nb$^2$: (Nb)$^2$; N$_{ds}$/N$_{cl}$: number of descending/climbing aircraft. |
| F$_5$, F$_{15}$, F$_{30}$, F$_{60}$ | Future incoming aircraft in horizons of 5 min, 15 min, 30 min, 60 min. |

TABLE 1-continued

| Factor | Annotation |
|---|---|
| Dens, hpro, vpro | Dens: density of aircraft; hpro: average horizontal proximity between two aircraft; vpro: average vertical proximity between two aircraft. |
| $\sigma_{gs}^2$, $\sigma_{gs}/\overline{gs}$, avg_vs | $\sigma_{gs}^2$: variance of aircraft ground speeds; $\sigma_{gs}/\overline{gs}$: ratio of $\sigma_{gs}$ (standard deviation of aircraft ground speeds) to aircraft average ground speed $\overline{gs}$; avg_vs: average of absolute values of aircraft vertical speeds. |
| inter_hori, | inter_hori: number of potential crossings of aircraft trajectories; |
| inter_vert | inter_vert: measures the mixing degree of aircraft in different flying mode (descending/level/climbing). |
| track_disorder, speed_disorder | track_disorder: variability in aircraft headings; speed_disorder: variability in aircraft speeds; |
| Div, Conv | Div: mean rate of divergences between aircraft pairs; Conv: mean rate of convergences between aircraft pairs. |
| sensi_d, sensi_c, insen_d, insen_c | sensi_d/sensi_c: sensitivity indicator which measures the mean distance change between diverging/converging aircraft when small speed and heading modifications are applied to them. |

$$\text{insen\_d:} \frac{\text{Div}^2}{\text{sensi\_d}}.$$

$$\text{insen\_c:} \frac{\text{Conv}^2}{\text{sensi\_c}}.$$

| creed_ok, creed_pb | creed_ok: conflict perception of "good pairs"; creed_pb: conflict perception of "bad pairs". good(bad) pair: the pair of two converging aircraft which are (not) vertically separated. |
| V | V: Volume of a sector |

In this embodiment, it is assumed that the SS level (low/normal/high complexity) of the target sector will be evaluated based on m factors. Therefore, a number of m-dimensional samples will be collected and learned on to construct the correlations between the factors and the situation levels. Besides the samples of the target sector, it is also possible to obtain and save up the samples of other non-target sectors. This is because, in real applications, there usually exist multiple target sectors whose situation needs to be evaluated. In such a case, a target sample set for each one of the target sectors needs to be collected and each target sample set is in effect a non-target sample set with respect to other target sectors. Note that the non-target samples can actually be utilized for training the SSEF of the target sector through a certain means despite the discrepancies between target and non-target samples. Therefore, we propose a SSEF which is able to use both target and non-target samples for the situation evaluation task of the target sector.

Figure 2A:
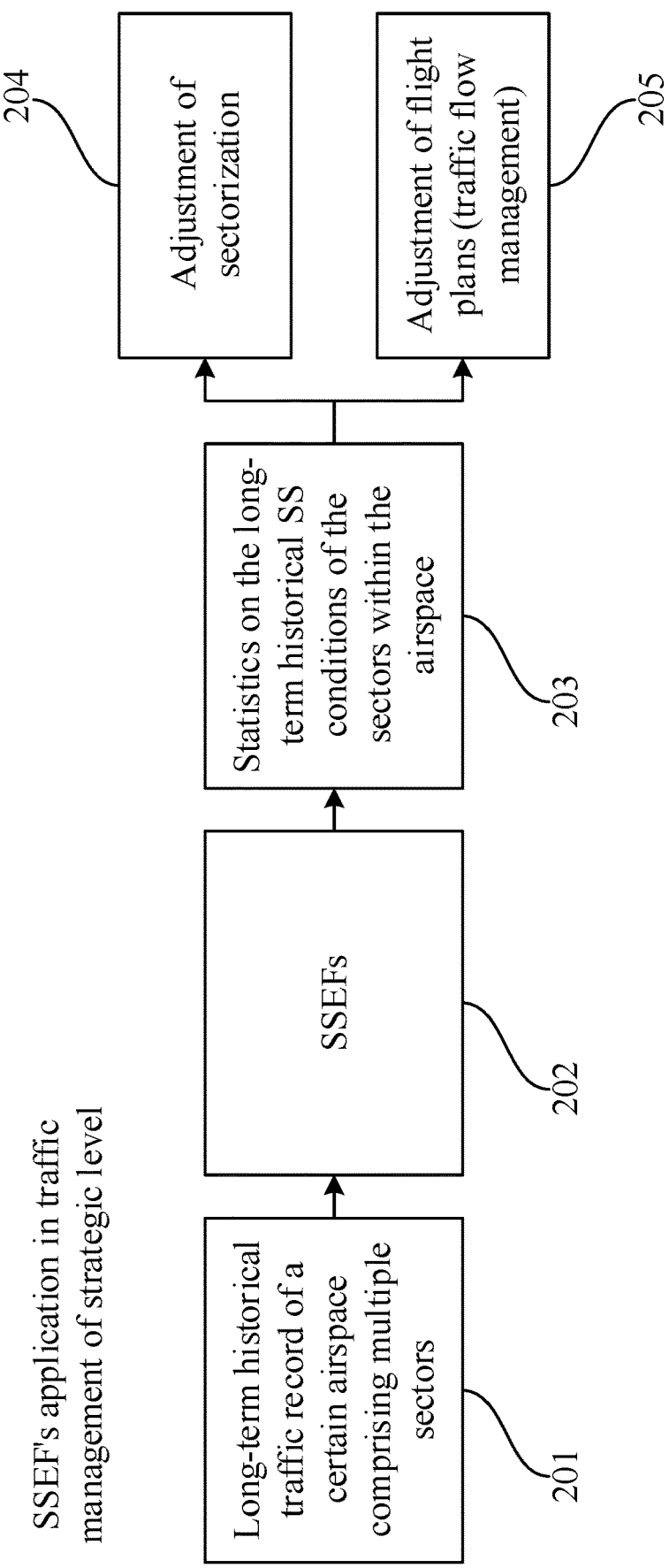
FIG. 2A and FIG. 2B show the general flows of the applications of the sector situation evaluation framework (SSEF) according to the present application.
Figure 2B:
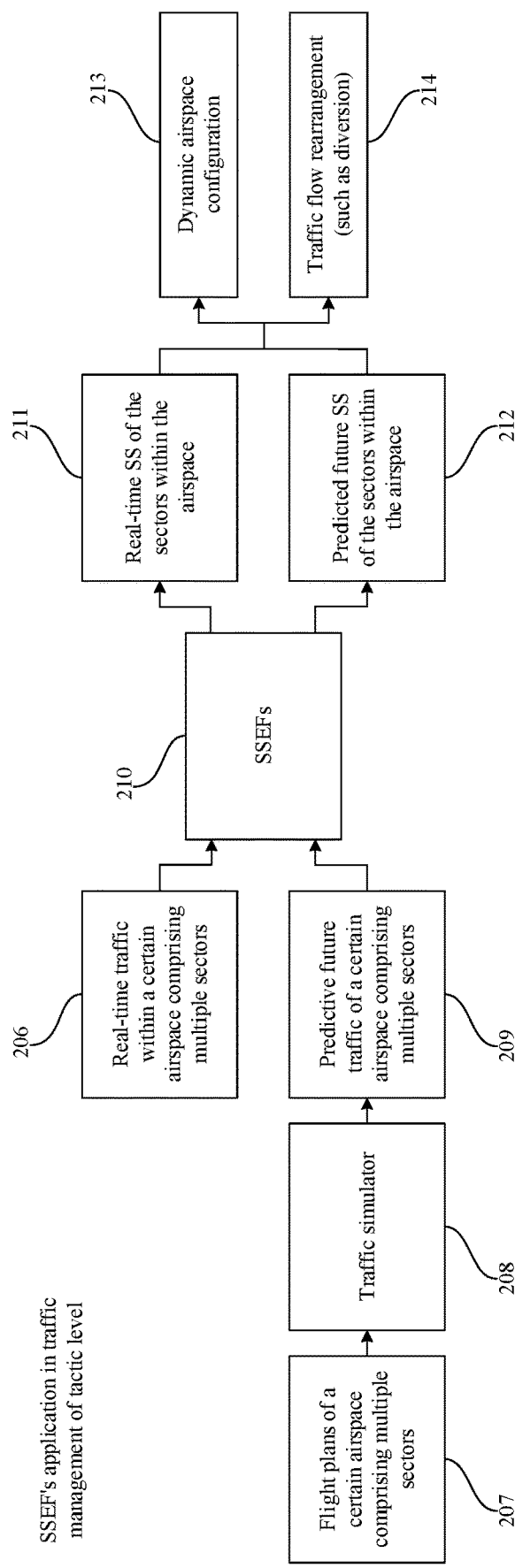

FIG. 2A and FIG. 2B exemplifies how to utilize the SSEF in real air traffic management. FIG. 2A shows this utilization on the strategic level. Specifically, the SSEF can be utilized to assist in airspace sectorization or flow management. The general procedures are, based on the long-term historical traffic record of an airspace of interest (Block 201), SSEFs 202 can be built for the sectors within the airspace. After that, the historical SS of the sectors can be evaluated by the SSEFs 202, and the statistics on the historical SS conditions of the sectors at 203 can be obtained. From the statistics, we can know which sectors are always in the situation of high complexity that leads to high operational safety risk, or in the situation of low complexity that leads to a waste of control resources (such as ATCos), thus we can implement the strategic sectorization 204 (such as splitting the sector whose SS is always high complexity) and traffic flow management 205 (e.g., reducing the number of the flights which are assigned to fly through the sectors with high complexity) under the guidance of the statistics.

FIG. 2B shows that the proposed SSEF can also assist in tactical traffic management methods, such as dynamic airspace configuration 213, or tactical flow management 214. Here, the applications of SSEF can be divided into two scenarios: real-time and predictive. In the real-time scenario, current SSs of the studied airspace (Block 211) can be evaluated online by SSEFs 210 based on real-time traffic data 206. While in the predictive scenario, a traffic simulator 208 is needed first to predict the future aircraft trajectories based on flight plans 207 so that predictive future traffic data 209 can be obtained, then SSEFs 210 can be used to evaluate the future SS conditions 212. The remaining procedures of utilizing the real-time/future SSs are similar to those in FIG. 2A. Therefore, the real-time SS condition 211 and predictive future SS conditions 212 can assist in dynamic airspace configuration 213, tactical flow management 214, and can also be used for high complexity situation alert.

Figure 3:
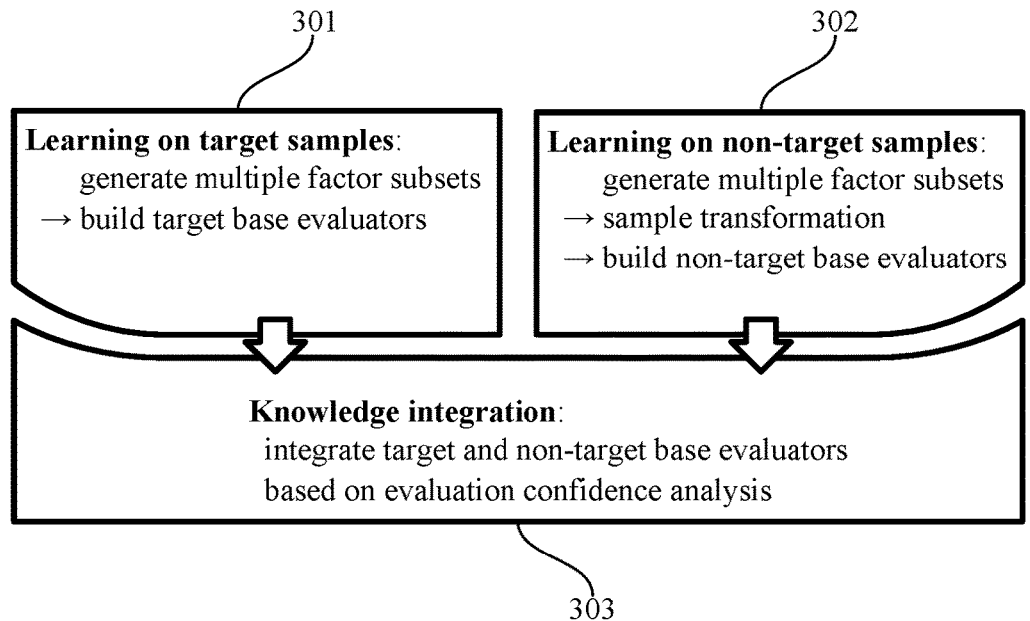
FIG. 3 shows the general diagram of SSEF according to the present application.

FIG. 3 shows the schematic of the proposed SSEF, which comprises three steps. In step 301, the strategies of multifactor subset generation and multi-base evaluator construction are used to sufficiently learn on the target samples. Then in step 302, the knowledge in non-target samples is effectively learned using strategies similar to those in step 301 together with a sample transformation. Finally in step 303, the base evaluators built in steps 301 and 302 are selectively integrated based on evaluation confidence analysis of these evaluators. Steps 302 and 303 work together seamlessly to achieve the process of transferring knowledge from non-target samples. In the following, we will elaborate on the three steps composing SSEF.

Figure 4:
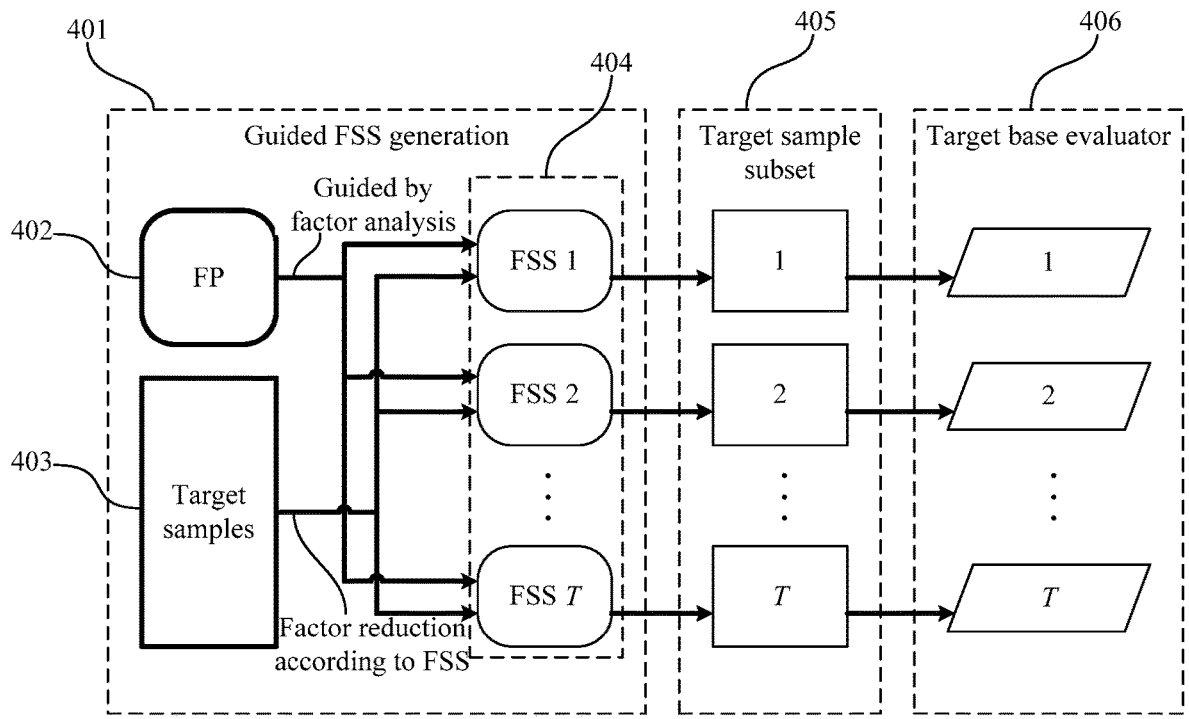
FIG. 4 shows the schematic of learning on the samples of the target sector.

FIG. 4 shows the details of target sample learning in step 301. Let $X^{(tar)}=[x_1^{(tar)}, x_2^{(tar)}, \ldots, x_{n_{tar}}^{(tar)}] \in \mathbb{R}^{m \times n_{tar}}$ denote the target samples, and $Y^{(tar)}=[y_1^{(tar)}, y_2^{(tar)}, \ldots, y_{n_{tar}}^{(tar)}] \in \mathbb{R}^{1 \times n_{tar}}$ denote the sample labels (SS levels) of the target samples in $X^{(tar)}$. $n_{tar}$ is the number of target samples. Each target sample $x_i^{(tar)}$ ($1 \leq i \leq n_{tar}$) comprises the values of m situation factors in factor pool (FP), while the label of $x_i^{(tar)}$-$y_i^{(tar)} \in \mathcal{Y}$, $\mathcal{Y}=\{L, N, H\}$, wherein "L", "N", "H" respectively represents the situation level of low complexity, normal complexity and high complexity.

In block 401, multiple factor subsets (FSSs) are generated through selecting factors from FP 402. In order to eliminate noisy and redundant factors within each FSS, the FSS needs to be generated under the a priori knowledge of factor criticality and independence. Hence, factor analysis needs to be implemented. The criticality of each factor is calculated based on the target dataset $D^{(tar)}=\{X^{(tar)}, Y^{(tar)}\}$ (block 403). And it is measured by the criterion of signal-to-noise ratio (SNR), which is defined as $$SNR(ft) = \frac{|\mu_H(ft) - \mu_N(ft)| + |\mu_N(ft) - \mu_L(ft)| + |\mu_H(ft) - \mu_L(ft)|}{\sigma_L(ft) + \sigma_N(ft) + \sigma_H(ft)},$$

where SNR(ft) is the SNR of the factor ft. $\mu_L(ft)$ and $\sigma_L(ft)$ are, respectively, the mean value and the standard deviation of ft's values attributed to the Category L. Similarly, $\mu_N(ft)$, $\sigma_N(ft)$, $\mu_H(ft)$ and $\sigma_H(ft)$ are the corresponding statistics of ft's values attributed to the Categories N and H. It is easy to find that the SNR value of a factor reflects the correlation degree between this factor and sample category (SS level). A larger SNR value indicates a stronger ability to discriminate among sample categories, that is, more critical to the situation evaluation task.

Besides measuring the criticality of each factor, the independence coefficient (IC) is used to evaluate the independence degree between each two factors. Its formula is $$IC_{ft2/ft1} = \frac{\sum_{i=1}^{n_{tar}} (ft2_i - ft2(ft1_i))^2}{\sum_{i=1}^{n_{tar}} (ft2_i - \overline{ft2})^2}, \quad 0 \leq IC_{ft2/ft1} \leq 1,$$

where $IC_{ft2/ft1}$ measures the independence of the factor ft2 from another factor ft1 (generally, $IC_{ft2/ft1} \neq IC_{ft1/ft2}$); $ft1_i$ and $ft2_i$ are respectively the values of ft1 and ft2 within the i th sample ($1 \leq i \leq n_{tar}$);

$$\overline{ft2} = \frac{1}{n_{tar}} \sum_{i=1}^{n_{tar}} ft2_i;$$

ft2(ft1) is the regression function between ft1 and ft2 which is obtained from the regression analysis based on the target samples. Specifically, ft2(ft1) can be obtained through the locally weighted linear regression method. In this method, the expression of the regression function is $$ft2(ft1)=[1, ft1](B^T W_{ft1} B)^{-1} B^T W_{ft1} ft2,$$

where $ft2=[ft2_1, ft2_2, \ldots, ft2_{n_{tar}}]^T$, $$B = \begin{bmatrix} 1 & 1 & \cdots & 1 \\ ft1_1 & ft1_2 & \cdots & ft1_{n_{tar}} \end{bmatrix}^T,$$

$W_{ft1}=\text{diag}(w_{ft1})(w_{ft1}=[w_{ft1}(ft1_1), w_{ft1}(ft1_2), \ldots, w_{ft1}(ft1_{n_{tar}})]^T$ is the weight vector for the sample points of ft1 which are used for calculating ft2(ft1)).

Next, T FSSs 404 are generated, each of which contains k non-duplicated factors in FP 402 (k<m). The FSS generation process is implemented under the guidance from the a priori knowledge on the factor's criticality and independence to prevent noisy and redundant factors from being selected into each FSS. FIG. 5 illustrates this guided FSS generation process. Note that, a FSS is generated by k loops each selecting one factor from FP 402. In each factor selection loop (except for the first loop), the chance of each candidate factor $fti^{(CFS)}$ (the ith factor in CFS) being selected into FSS is positively correlated with not only its relevance for classification (measured by $SNR(fti^{(CFS)})$) but also its independence from the factors previously selected into FSS in earlier loops (measured by $\min_{ftj^{(FSS)} \in FSS} IC_{fti^{(CFS)}/ftj^{(FSS)}}$, where $ftj^{(FSS)}$ is the jth factor in FSS). The factor selection probability should be appropriately adjusted by tuning $\alpha$ and $\beta$ in the range of [0, +∞) (here we specifically define that $[SNR(ft_i^{(CFS)})]^\alpha = 1$ when both $SNR(ft_i^{(CFS)})$ and $\alpha$ equal 0). The process of generating a FSS is repeated independently for T times, so that T FSSs are obtained. Through the guided FSS generation strategy, noisy and redundant factors are properly excluded in FSSs, particularly the factors that are both nosy and redundant.

After T FSSs 404 are generated, factor reduction is implemented on $X^{(tar)}$ according to each FSS, so that finally T dimension-reduced target sample subsets 405 are obtained (wherein each target sample subset comprises a dimension-reduced $X^{(tar)}$ and $Y^{(tar)}$) Based on each target sample subset, a target base evaluator (among the target base evaluators 406) is built (subsequently, "target/non-target base evaluator" is used to refer to the base evaluators trained by target/non-target samples). Thus, T target base evaluators 406 are finally obtained.

Figure 6:
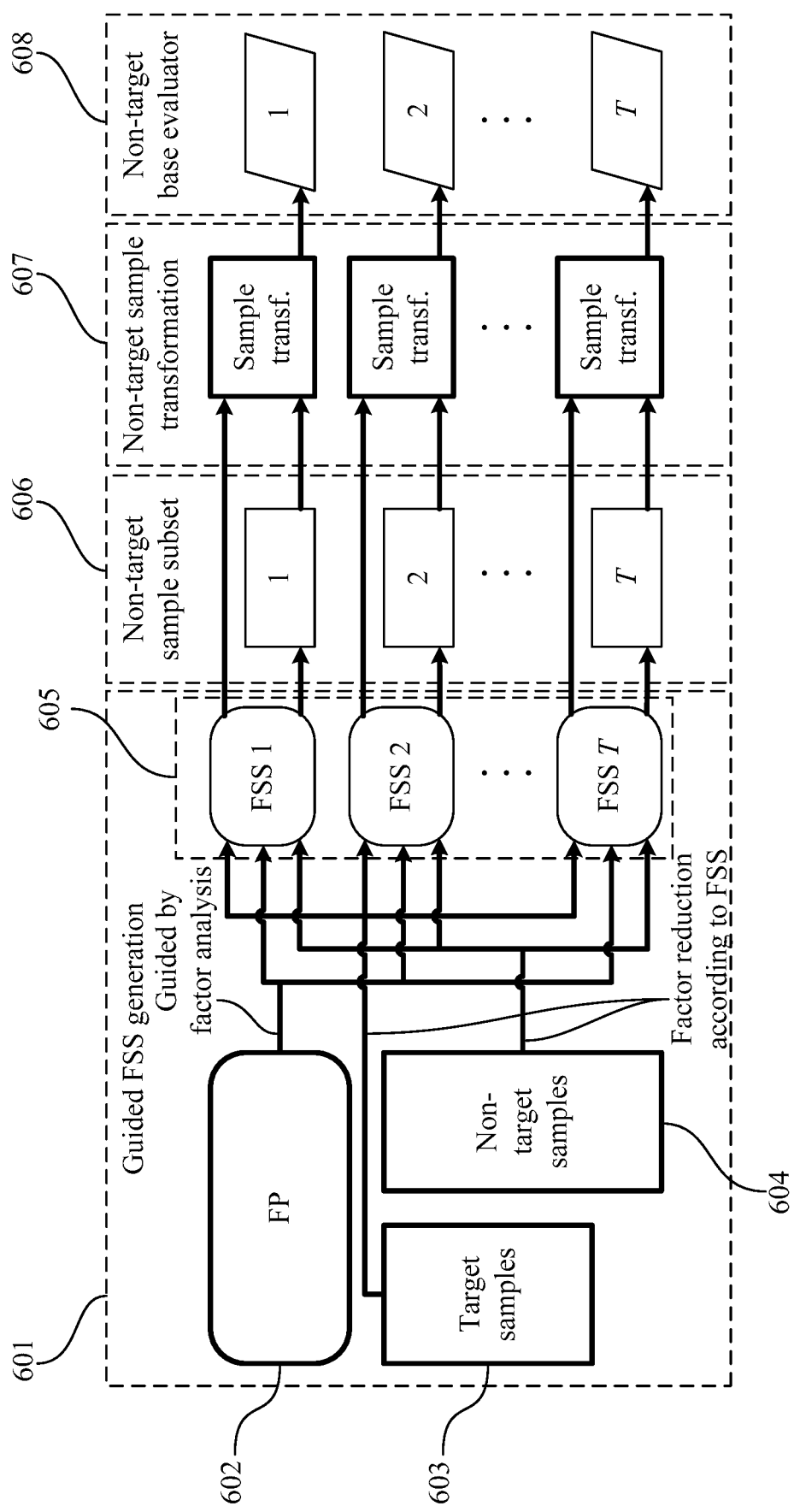
FIG. 6 shows the schematic of learning on the samples of a non-target sector.

In FIG. 3, besides sufficiently learning on the target samples in step 301, effectively learning on the non-target samples in step 302 is also critical for achieving a satisfactory SS evaluation performance. It is noted that if the non-target samples are derived from multiple non-target sectors, the mining of each sector's samples will be addressed separately. FIG. 6 shows the schematic of learning on the samples of a non-target sector. For learning on these non-target samples 604, some of same learning strategies as in step 301 are applied to generate T FSSs 605 (each FSS containing k factors), followed by building the non-target sample subsets 506 corresponding to these FSSs. Then, in block 607, each non-target sample subset will be transformed into a new sample space, in which the discrepancies between the non-target and target samples are decreased. After that, based on each transformed non-target sample subset, a base evaluator will be trained. Thus, T non-target base evaluators 608 are finally obtained.

Here we elaborate on the procedures of the non-target sample subset transformation in block 607. Let $D^{(ntdr)} = \{X^{(ntdr)}, Y^{(nt)}\}$ denote a non-target sample subset (among the T non-target sample subsets 606), where $X^{(ntdr)} = [x_1^{(ntdr)}, x_2^{(ntdr)}, \ldots, x_{n_{nt}}^{(ntdr)}] \in \mathbb{R}^{k \times n_{nt}}$ contains $n_{nt}$ non-target samples of k factors ($X^{(ntdr)}$ has been dimension-reduced from the original non-target samples 604 according to a certain FSS among the T FSSs (605), $Y^{(nt)} = [y_1^{(nt)}, y_2^{(nt)}, \ldots, y_{n_{nt}}^{(nt)}] \in \mathbb{R}^{1 \times n_{nt}}$ is the sample labels (SS levels) of the non-target samples. Moreover, a paired dimension-reduced target sample subset $D^{(tardr)} = \{X^{(tardr)}, Y^{(tar)}\}$ is obtained through implementing the dimension-reduction on the target samples 603 (viz. $D^{(tar)}$) according to the same FSS corresponding to $X^{(ntdr)}$. $X^{(tardr)} = [x_1^{(tardr)}, x_2^{(tardr)}, \ldots, x_{n_{tar}}^{(tardr)}] \in \mathbb{R}^{k \times n_{tar}}$, $Y^{(tar)} = [y_1^{(tar)}, y_2^{(tar)}, \ldots, y_{n_{tar}}^{(tar)}] \in \mathbb{R}^{1 \times n_{tar}}$. Let $X = [X^{(tardr)}, X^{(ntdr)}] \in \mathbb{R}^{k \times n}$, $n = n_{tar} + n_{nt}$, $Y = [Y^{(tar)}, Y^{(nt)}] \in \mathbb{R}^{1 \times n}$.

The first sample transformation step is mapping X into a Reproducing Kernel Hilbert Space $\mathcal{H}$ with a kernel g. Let $g(x, \cdot)$ denote the element in $\mathcal{H}$ to which the sample x is mapped. Generally, $g(x, \cdot)$ is a transformed sample of infinite-dimensionality. Thereupon, X is mapped to $g(X, \cdot) = [g(x_1, \cdot), g(x_2, \cdot), \ldots, g(x_n, \cdot)] \in \mathbb{R}^{\infty \times n}$, where $x_i$ is the ith sample in X, that is $$x_i = \begin{cases} x_i^{(tardr)} & 1 \leq i \leq n_{tar} \\ x_{i-n_{tar}}^{(ntdr)} & n_{tar}+1 \leq i \leq n \end{cases}.$$

In order to make every kernel-transformed sample in $g(X, \cdot)$ finite-dimensional, a further sample mapping manipulation is conducted on $g(X, \cdot)$ with the transformation matrix V, that is, $g(X, \cdot)$ is mapped to $V^T g(X, \cdot)$. Here, the transformation matrix V is specifically designed as $g(X, \cdot)W$, where $W \in \mathbb{R}^{n \times m_w}$, $m_w$ determines the column number of V, and also the dimensionality of the transformed samples $V^T g(X, \cdot)$. Thus, through two round transformation, X is eventually mapped to $V^T k(X, \cdot) = W^T g(X, \cdot)^T g(X, \cdot) = W^T G \in \mathbb{R}^{m_w \times n}$, where $G = g(X, \cdot)^T g(X, \cdot) \in \mathbb{R}^{n \times n}$ (the gram matrix of $g(X, \cdot)$) is the kernel matrix of X; $x_i$ within X is transformed as $V^T g(x_i, \cdot) = W^T g(X, \cdot)^T g(x_i, \cdot)$, which is the ith column of $W^T G$. Thereupon, the former $n_{tar}$ columns of $W^T G$ are the transformed samples $W^T g(X, \cdot)^T g(X^{(tardr)}, \cdot)$ corresponding to $X^{(tardr)}$, while the last $n_{nt}$ columns are the transformed samples $W^T g(X, \cdot)^T g(X^{(ntdr)}, \cdot)$ corresponding to $X^{(ntdr)}$.

According to the characteristics of kernels, $G = g(X, \cdot)^T g(X, \cdot) = [g(x_i, \cdot)^T g(x_j, \cdot)]_{1 \leq i,j \leq n} = [g(x_i, x_j)]_{1 \leq i,j \leq n}$. In kernel embedding methods, researchers generally use predefined kernels, such as Gaussian kernel, Laplace kernel and polynomial kernel, etc. If the kernel g is determined $g(x_i, x_j)$ is determined and easy to calculate based on a specific closed-form formula. Here we use Gaussian kernel, that is $$g(x_i, x_j) = \frac{\|x_i - x_j\|^2}{2\sigma^2},$$

where $\sigma$ is the bandwidth parameter that needs to be tuned in real application. Therefore, in order to obtain a suitable transformed samples $W^T G$, only W needs to be optimized. The goal of the sample transformation mechanism is to minimize the discrepancies of non-target samples from target samples while preserving the categorical knowledge of the samples. Hence, the problem of optimizing sample transformation can be formulated as $$\min_W tr(W^T G \Omega G W) + \mu tr(W^T W)$$
$$\text{s.t.} \quad W^T G H_n \mathcal{L} H_n G W = I_n$$

where $tr(\cdot)$ denotes the trace of matrix, $\Omega = \Sigma_{c \in \mathcal{Y}} \Omega_c$, $\Omega_c = \Sigma_{c \in \mathcal{Y}} \omega_c \omega_c^T$, $\omega_c = [\omega_1^c, \omega_2^c, \ldots, \omega_n^c]^T$, $$\omega_i^c = \begin{cases} \frac{1}{n_{tar}^{y=c}} & 1 \leq i \leq n_{tar} \text{ and } y_i = c \\ -\frac{1}{n_{nt}^{y=c}} & n_{tar}+1 \leq i \leq n \text{ and } y_i = c \\ 0 & \text{Otherwise} \end{cases},$$

$n_{tar}^{y=c}$ and $n_{tar}^{y=c}$ respectively are the number of target and non-target samples belonging to category c ($c \in \mathcal{Y}$), $y_i$ is the ith element in Y. $\mu$ is a trade-off parameter.

Within the constraint (namely, the equation that follows "s. t."), $I_n$ is the nth order identity matrix, $H_n$ is the nth order centering matrix defined as $$H_n = I_n - \frac{1}{n} \mathbf{1} \mathbf{1}^T,$$

$\mathbf{1} \in \mathbb{R}^{n \times 1}$ is the column vector with all 1's. $\mathcal{L} = L + \gamma I_n$, L is a kernel matrix of Y with respect to kernel l, that is, $L = l(Y, \cdot)^T l(Y, \cdot) \in \mathbb{R}^{n \times n}$, where $l(Y, \cdot) = [l(y_1, \cdot), l(y_2, \cdot), \ldots, l(y_n, \cdot)] \in \mathbb{R}^{\infty \times n}$ is the matrix to which Y is manned. $\gamma$ is a trade-off parameter and $\gamma I_n$ is employed to avoid the singularity of $\mathcal{L}$.

In this optimization formulation, $tr(W^T G \Omega G W)$ measures the sample distribution discrepancies between the transformed $X^{(ntdr)}$ and $X^{(tardr)}$ of the same category, $tr(W^T W)$ represents the matrix complexity of W, and $tr(W^T G H_n \mathcal{L} H_n G W)$ evaluates the correlation degree between the transformed samples $W^T G$ and their labels Y. Such correlation can be recognized as the retaining volume of the SS evaluation knowledge contained in non-target and target samples after being transformed. The optimized solution $W^* \in \mathbb{R}^{n \times m_w}$ is a matrix composed of the $m_W$ leading eigenvectors of $(G\Omega G+\mu I_n)^{-1}GH_n\mathcal{L}H_nG$.

It is noted that if the non-target base evaluator trained by the transformed non-target samples $W^Tg(X,\bullet)^Tg(X^{(ntdr)},\bullet)$ is used to evaluate an unclassified target sample $x^{(tst)}$, $x^{(tst)}$ needs to be transformed to the same sample space of $W^Tg(X,\bullet)^Tg(X^{(ntdr)},\bullet)$ first, that is, $x^{(tst)}$ is transformed to $W^Tg(X,\bullet)^Tg(x^{(tst)},\bullet)$. After that, the non-target base evaluator can be used to classify $W^Tg(X,\bullet)^Tg(x^{(tst)},\bullet)$ to obtain the classification result of $x^{(tst)}$.

If the non-target samples belong to s non-target sectors, the abovementioned non-target sample learning procedures in FIG. 6 will be repetitively implemented for the sample set of each non-target sector. Hence, sT non-target base evaluators will eventually be obtained.

According to FIG. 3, after T target base evaluators and sT non-target base evaluators are obtained through steps 301 and 302, the next step 303 is to reasonably integrate these base evaluators. Specifically, for a target sample to be evaluated, the confidence of every base evaluator on evaluating this sample is first calculated, then the base evaluators which have relatively high confidence are chosen and their evaluation outputs are integrated by weighted voting. The details are elaborated on as follows.

Assume a target sample $x^{(tst)}$ needs to be evaluated. To achieve this, the confidence of each base evaluator $baev_j$ on evaluating $x^{(tst)}$ needs to be calculated ($1 \leq j \leq (s+1)T$). First, transform $x^{(tst)}$ and the target sample set $X^{(tar)}$ into the sample space corresponding to $baev_j$. Then, within this sample space, select $n_{tarnear}$ samples in $X^{(tar)}$ which are the nearest to the $x^{(tst)}$. After that, employ $baev_j$ to classify these $n_{tarnear}$ nearest samples and use the classification accuracy as the confidence of $baev_j$ (and also the weight of $baev_j$) on evaluating $x^{(tst)}$. Thereupon, a confidence threshold $\theta$ is used to determine which base evaluators should be selected out to compose the final SS evaluator. At last, integrate the outputs of all the selected base evaluators through weighted voting to obtain the final result of evaluating $x^{(tst)}$.

The confidence threshold $\theta$ is an empirical parameter that is to be adjusted in real applications. The above steps of base evaluator integration will be implemented independently for every target sample that needs to be evaluated.

What is claimed is:

1. An airspace situation evaluation framework for an airspace, the evaluation framework comprising a server and a memory module connected to the server via a local area or wide area network, wherein the airspace includes a target sector and multiple non-target sectors, the memory module stores sector situation (SS) samples and airspace operation data including aircraft trajectory data and airspace configuration data, and the evaluation framework evaluates the airspace situation by executing steps including:
   (a) generating target samples from the airspace operation data, storing the target samples in the memory module, and learning knowledge from the target samples using multi-factor subset generation and multi-base evaluator construction to build target base evaluators, wherein the target samples are sector situation samples derived from the target sector;
   (b) generating non-target samples from the airspace operation data, storing the non-target samples in the memory module, and learning knowledge in the non-target samples using multi-factor subset generation and multi-base evaluator construction, together with a sample transformation, to build non-target base evaluators, wherein the non-target samples are sector situation samples derived from one or more of the non-target sectors; and
   (c) integrating the target base evaluators and the non-target base evaluators based on evaluation confidence analysis of the target base evaluators and the non-target base evaluators.

2. The airspace situation evaluation framework of claim 1, wherein each of the target or non-target samples comprises values of a plurality of airspace situation factors, and a situation index which is a continuous or discrete value reflecting a situation corresponding to the values of the plurality of airspace situation factors.

3. The airspace situation evaluation framework of claim 1, wherein in step (b) the sample transformation is used to transform the non-target samples into transformed non-target samples in order to eliminate discrepancies between the transformed target samples and the transformed non-target samples, so that the non-target base evaluators built from the transformed non-target samples have higher confidence on evaluating the target samples than those non-target base evaluators built without the sample transformation.

4. The airspace situation evaluation framework of claim 3, wherein the sample transformation for the non-target samples is implemented through a kernel embedding method.

5. The airspace situation evaluation framework of claim 4, wherein the kernel embedding method is implemented as solving a transformation matrix optimization problem with optimization goals of: within a common sample space into which the target and non-target samples are transformed, (i) minimizing discrepancies between the transformed target samples and the transformed non-target samples of a same category; and (ii) preserving the volume of knowledge for SS evaluation contained in the transformed non-target and target samples, which is measured by a dimension-category correlation degree of the transformed target and non-target samples.

6. The airspace situation evaluation framework of claim 1, wherein in step (c) a weight of each of the base evaluators on evaluating a target sample is assigned as the confidence of the base evaluator for evaluating the target sample, then selecting out a portion of the base evaluators with higher weights among all the target and non-target base evaluators.

7. The airspace situation evaluation framework of claim 6, wherein the weights of the base evaluators are calculated with respect to each of the target samples to be evaluated.

8. A method of evaluating an airspace situation for an airspace having a target sector and multiple non-target sectors, the method comprising the steps of:
   (A) providing a server and a memory module connected to the server via a local area or wide area network, wherein the memory module stores sector situation (SS) samples and airspace operation data including aircraft trajectory data and airspace configuration data;
   (B) the server generating target samples from the airspace operation data, storing the target samples in the memory module, and executing a software program to learn knowledge from the target samples using multi-factor subset generation and multi-base evaluator construction to build target base evaluators, wherein the target samples are sector situation samples derived from the target sector;
   (C) the server generating non-target samples from the airspace operation data, storing the non-target samples in the memory module, and executing the software program to learn knowledge in the non-target samples using multi-factor subset generation and multi-base evaluator construction, together with a sample transformation, to build non-target base evaluators, wherein the non-target samples are sector situation samples derived from one or more of the non-target sectors; and (D) the server integrating the target base evaluators and the non-target base evaluators based on evaluation confidence analysis of the target base evaluators and the non-target base evaluators.

9. The method of claim 8, wherein each of the target or non-target samples comprises values of a plurality of airspace situation factors, and a situation index which is a continuous or discrete value reflecting a situation corresponding to the values of the plurality of airspace situation factors.

10. The method of claim 8, wherein in step (C) the sample transformation is used to transform the non-target samples into transformed non-target samples in order to eliminate discrepancies between the transformed target samples and the transformed non-target samples, so that the non-target base evaluators built from the transformed non-target samples have higher confidence on evaluating the target samples than those non-target base evaluators built without the sample transformation.

11. The method of claim 10, wherein the sample transformation for the non-target samples is implemented through a kernel embedding method.

12. The method of claim 11, wherein the kernel embedding method is implemented as solving a transformation matrix optimization problem with optimization goals of: within a common sample space into which the target and non-target samples are transformed, (i) minimizing discrepancies between the transformed target samples and the transformed non-target samples of a same category; and (ii) preserving the volume of knowledge for SS evaluation contained in the transformed non-target and target samples, which is measured by a dimension-category correlation degree of the transformed target and non-target samples.

13. The airspace situation evaluation framework of claim 8, wherein in step (C) a weight of each of the base evaluators on evaluating a target sample is assigned as the confidence of the base evaluator for evaluating the target sample, then selecting out a portion of the base evaluators with higher weights among all the target and non-target base evaluators.

14. The airspace situation evaluation framework of claim 13, wherein the weights of the base evaluators are calculated with respect to each of the target samples to be evaluated.

* * * * *